W. B. BRIDGES.
ROLLER BEARING CAR WHEEL.
APPLICATION FILED MAR. 10, 1920.

1,375,554.

Patented Apr. 19, 1921.

WITNESSES

INVENTOR
W. B. BRIDGES
BY
ATTORNEYS

UNITED STATES PATENT OFFICE.

WILEY B. BRIDGES, OF TEXARKANA, ARKANSAS.

ROLLER-BEARING CAR-WHEEL.

1,375,554.  Specification of Letters Patent.  Patented Apr. 19, 1921.

Application filed March 10, 1920. Serial No. 364,815.

*To all whom it may concern:*

Be it known that I, WILEY B. BRIDGES, a citizen of the United States, and a resident of Texarkana, in the county of Miller and State of Arkansas, have invented a new and Improved Roller-Bearing Car-Wheel, of which the following is a full, clear, and exact description.

The invention relates to wheels having a roller bearing interposed between the rim and axle, and its object is to provide a new and improved roller bearing car wheel, which is simple and durable in construction, composed of comparatively few parts and arranged to permit of easily making repairs without requiring removal of the axle from the car.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in both views.

Figure 1:
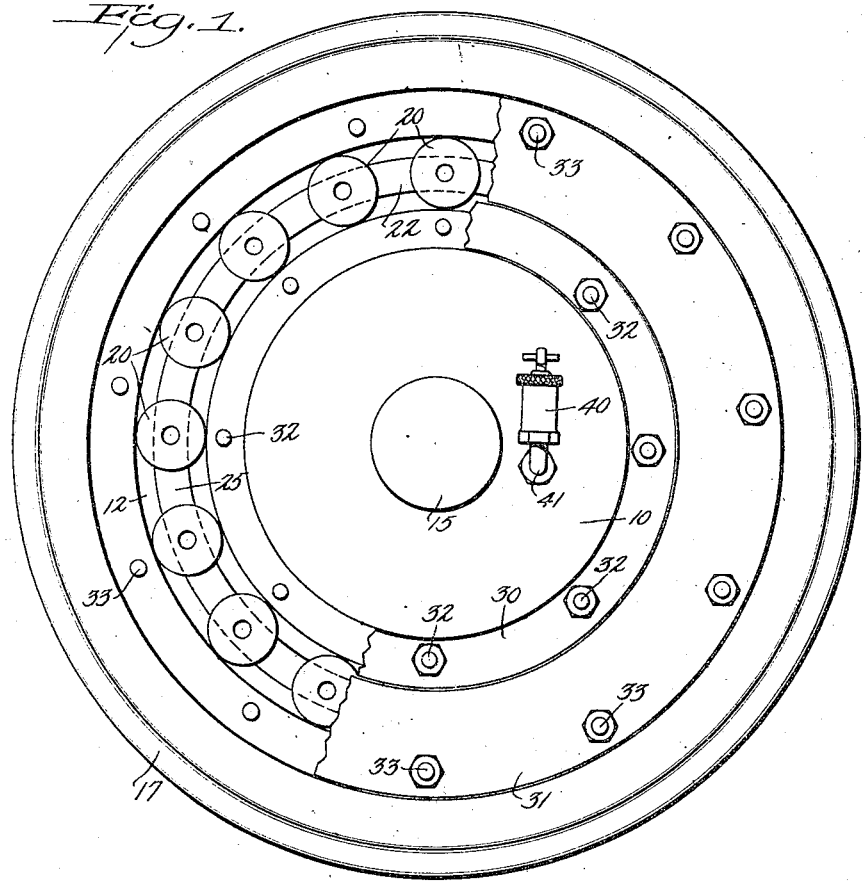
Figure 2:
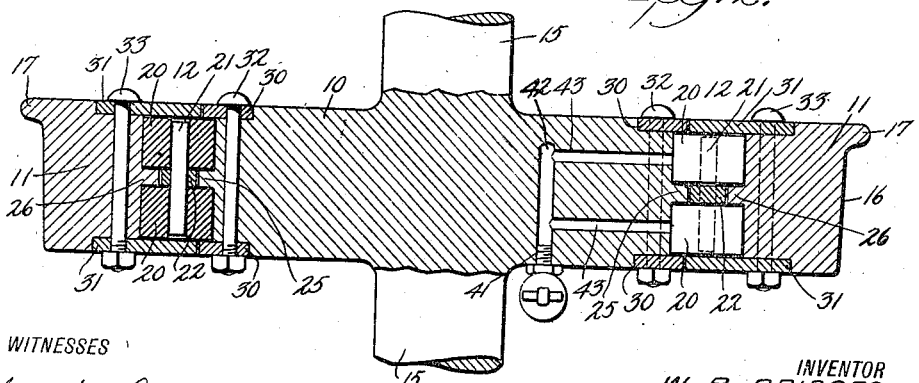

Figure 1 is a face view of the improved roller bearing car wheel with parts broken out; and Fig. 2 is a sectional plan view of the same.

The car wheel in its general construction comprises a stationary center 10, a rim 11, and a roller bearing 12 interposed between the peripheral face of the center 10 and the inner edge of the rim 11. The center 10 is provided with a central support 15 for supporting the car on which the car wheels are used. The rim 11 is provided with the usual tread 16 and flange 17 adapted to travel along the inner edge of the head of the rail on which the car wheel travels.

The roller bearing 12 comprises pairs of rollers 20 with the rollers of each pair mounted on a shaft 21. The several shafts 21 of the pairs of rollers 20 engage a ring 22 located between the rollers of each pair thus holding the rollers of each pair in spaced relation to each other. The ring 22 is in alinement with integral annular shoulders 25 and 26, of which the annular shoulder 25 is formed integrally on the peripheral face of the center 10, and the shoulder 26 is formed on the inner edge of the rim 11. The shoulders 25 and 26 hold the rollers 20 of each pair spaced apart and at the same time take up side thrust.

In order to hold the rollers 20 in position between the center 10 and the rim 11 use is made of retaining rings 30 and 31 secured to the faces of the center 10 and the rim 11 by transverse bolts 32 and 33 or other suitable fastening devices. The retaining rings 30 and 31 are preferably flush with the faces of the center 10 and the rim 11 so as to present no undesirable projections. It will be noticed that by the arrangement described the retaining rings 30 and 31 can be readily removed whenever it is desired to remove any one of the rollers 20 in case such roller is worn out and also to allow of replacing a worn out rim 11 by a new one whenever it is deemed necessary. It is understood that when the car wheel is in use the rim 11 turns while the center 10 is held stationary and hence the rims 11 mounted to turn on the stationary centers 10 and forming a pair of wheels for a car can turn independently one of the other.

In order to keep the roller bearings properly lubricated use is made of an oil cup 40 having an outlet nipple 41 screwed into the outer end of a transverse channel 42 formed in the center 10, and this channel 42 is connected by branch channels 43 with the peripheral face of the center 10 at opposite sides of the shoulder 25 thus supplying lubricant to the rollers 20 of each pair of rollers.

The roller bearing car wheel shown and described permits the use of a stationary axle or a similar support, and hence axle journals and bearings for the same as now generally constructed are entirely dispensed with.

Having thus described my invention, I claim as new and desire to secure by Letters Patent:—

1. A car wheel, comprising a fixed center provided on its peripheral face with an annular shoulder, a rim having a tread and flange and provided on its inner edge with an annular shoulder opposite the said center shoulder, pairs of rollers interposed between the said center and the said rim, the rollers of each pair being arranged on opposite sides of the said shoulders, shafts, one for each pair of rollers, and a spacing ring extending between the said shoulders and the rollers of each pair and carrying the said shafts.

2. A car wheel, comprising a fixed center provided on its peripheral face with an annular shoulder, a rim having a tread and flange and provided on its inner edge with an annular shoulder opposite the said center shoulder, pairs of rollers interposed between the said center and the said rim, the rollers of each pair being arranged on opposite sides of the said shoulders, shafts, one for each pair of rollers, a spacing ring extending between said shoulders and the rollers of each pair and carrying the said shafts, and retaining rings attached to the faces of the said center and rim to hold the rollers in place.

WILEY B. BRIDGES.